United States Patent [19]

Tanaka

[11] Patent Number: 4,832,855

[45] Date of Patent: May 23, 1989

[54] IMMERSION OIL FOR MICROSCOPY

[75] Inventor: Toshiaki Tanaka, Tokuyama, Japan

[73] Assignee: Idemitsu Petrochemical Company Limited, Tokyo, Japan

[21] Appl. No.: 137,216

[22] Filed: Dec. 22, 1987

[30] Foreign Application Priority Data

Jan. 14, 1987 [JP] Japan .................................. 62-6807

[51] Int. Cl.$^4$ .............................................. C09K 3/00
[52] U.S. Cl. .......................................... 252/1; 252/9; 73/40; 374/4
[58] Field of Search ..................... 252/1, 9, 11; 73/40; 374/4

[56]     References Cited

U.S. PATENT DOCUMENTS 4,465,621  8/1984  Sacher ................................. 252/582

Primary Examiner—Matthew A. Thexton
Assistant Examiner—Catherine S. Kilby
Attorney, Agent, or Firm—Armstrong, Nikaido Marmelstein Kubovcik & Murray

[57]     ABSTRACT

The present invention provides an immersion oil for microscopy, especially suitably a fluorescence microscopy which is superior in properties required for immersion oil for microscopy. This immersion oil comprises a phthalic acid dialkyl ester and a chlorinated paraffin.

12 Claims, No Drawings

IMMERSION OIL FOR MICROSCOPY

FIELD OF THE INVENTION

The present invention relates to an immersion oil for microscopy and more particularly it relates to a low fluorescence immersion oil for microscopy.

BACKGROUND OF THE INVENTION

An immersion oil which increases numerical aperture of objective lens is sometimes used for enhancement of magnifying power of microscopy. As the immersion oil, there have been known those which are mainly composed of glycerin, silicone oil or polybiphenyl chloride (PCB).

However, glycerin has hygroscopicity and a lower refractive index and silicone oil also has the defects of high viscosity and low refractive index. On the other hand, PCB is harmful for human bodies.

In order to solve these problems, an immersion oil composed of diphenylmethane derivative and liquid paraffin has been proposed in Japanese Patent Examined Publication No.35053/80.

Furthermore, U.S. Pat. No. 4465621 discloses an immersion oil for microscopy comprising butylbenzyl phthalate and chlorinated paraffin.

These immersion oils nearly suffice various properties required for immersion oils for microscopy such as refractive index, Abbe's number, viscosity and resolving power, but still have the problem of too high fluorescene according to measurement by spectrophotometer.

That is, fluorescence microscopy uses as a light source an ultra-high pressure mercury lamp which emits ultraviolet rays which excite fluorescence. Exciting lights used in this case include U excitation which comprises excitation of fluorescence by a filter of mainly 365 nm in wavelength, V excitation which comprises excitation by bright line ultraviolet rays of 405 nm or 435 nm or by wide exciting light of VB excitation, B excitation which comprises excitation of fluorescence by an exciting filter of mainly 410 nm and G excitation which comprises excitation of fluorescence by an exciting filter of mainly 546 nm. Since fluorescence emitted from a sample by these exciting lights is observed by fluorescence microscopy, immersion oil to be used is desirably less in emission of fluorescence. The immersion oil mainly composed of a compound having a plurality of aromatic rings such as disclosed in Japanese Patent Examined Publication No.35053/80 and U.S. Pat. No. 4465621 emit much fluorescence and cannot effectively be used for fluorescence microscopy. The immersion oil disclosed in U.S. Pat. No. 4465621 has further problem of inferior hue.

SUMMARY OF THE INVENTION

The object of the present invention is to provide an immersion oil for microscopy superior in characteristics required for immersion oil for microscopy such as refractive index, Abbe's number, kinematic viscosity, non-drying property, weathering resistance, corrosion resistance, contrast, resolving power and chromatic aberration, low in fluorescence, good in hue and high in transparency.

The present invention which solves the above problems is an immersion oil for microscopy, characterized by containing a phthalic acid dialkyl ester and chlorinated paraffin.

DETAILED EXPLANATION OF THE INVENTION

As the phthalic acid dialkyl ester which is a component constituting the immersion oil for microscopy of the present invention, an alkyl ester of 1-5 carbon atmos is normally used. When it is not an alkyl ester, for example, when it contains a double bond or aromatic ring, the immersion oil tends to increase in fluorescence and so such compounds are not desired. Alkyl esters of 6 or more carbon atoms are apt to cause reduction in stability and increase in viscosity of the immersion oil and decrease in refractive index of the immersion oil.

The two alkyl groups of the phthalic acid dialkylesters may be different, but desirably they are identical.

As the phthalic acid dialkyl esters used in the present invention, mention may be made of, for example, dimethyl phthalate, diethyl phthalate, dipropyl phthalate, di n-butyl phthalate, di tert-butyl phthalate and dipentyl phthalate, among which dimethyl phthalate and diethyl phthalate are preferred. These may be used alone or in combination.

The immersion oil for microscopy of the present invention contains said phthalic acid dialkyl ester and chlorinated paraffin.

The chlorinated paraffin used in the present invention may be ordinary ones, namely, this can be prepared by chlorination of, for example, liquid paraffin. The liquid paraffin can be obtained purification of, for example, lubricating oil fractions such as spindle oil fraction, refrigerating machine oil fraction, dynamo oil fraction, machine oil fraction and turbine oil fraction by subjecting them to washing treatment with sulfuric acid or treatment with clay.

In the present invention, there may be suitably used such chlorinated paraffin as having an acid value below 0.50 KOH mg/g, a viscosity at 25° C. within the range of 0.5–40,000 poises, a specific gravity at 25° C. within the range of 1.10–1.80 and a chromaticity (APHA) below 350.

Furthermore, in the present invention, it is preferred to use at least two kinds of chlorinated paraffin different in content of chlorine. Especially, viscosity and Abbe's number of the immersion oil for microscopy of the present invention can be effectively reduced by suitably blending at least two kinds of chlorinated paraffin different in content of chlorine.

When two kinds of chlorinated paraffin are used, normally these are divided into those having chlorine content of 55% by weight or less (sometimes referred to as "low chlorinated paraffin" hereinafter) and those having a chlorine content of more than 55% by weight (sometimes referred to as "high chlorinated paraffin" hereinafter) and the two of respective groups are used in admixture. Especially, it is preferred to use a chlorinated paraffin having a chlorine content of 55% by weight or less (suitably 55–35% by weight) as the low chlorinated paraffin and a chlorinated paraffin having a chlorine content of 55% by weight or more (suitably 60–75% by weight) as the high chlorinated paraffin.

Weight ratio of low chlorinated paraffin and high chlorinated paraffin to be blended is usually within the range of 10:90–80: 20, especially preferably 10:90–50:50. When amount of high chlorinated paraffin is increased, characteristics of the resulting immersion oil tend to be further improved.

Blending ratio (weight ratio) of the phthalic acid dialkyl ester and the chlorinated paraffin may be optionally set, but in the present invention, preferably is 20:80–70:30. When both of said low chlorinated paraffin and high chlorinated paraffin are used, weight of chlorinated paraffin is sum of weights of these chlorinated paraffin.

When the blending ratio of the phthalic acid dialkyl ester and the chlorinated paraffin is set within the range of 25:75–60:40, the characteristics of the immersion oil for microscopy tend to be further improved.

The immersion oil for microscopy of the present invention can be prepared by mere mixing of said phthalic acid dialkyl ester and said chlorinated paraffin.

The mixing can be performed normally by stirring them at room temperature or under heating for 1 minute or more.

The thus obtained immersion oil for microscopy of the present invention has an Abbe's number (which shows dispersibility) of 40–58 (suitably 42–46).

The immersion oil has normally a refractive index of 1.5–1.6. Furthermore, by adjusting the components of the immersion oil, the refractive index can be adjusted to $1.515\pm0.0005$ which is close to the refractive index of objective lens.

Kinematic viscosity at 25° C. of the immersion oil for microscopy of the present invention is normally 50,000 centistokes or less. Especially, when, for example, dimethyl phthalate is used, the kinematic viscosity can be reduced to less than 100 centistokes and when, for example, diethyl phthalate is used, it can be reduced to less than 300 centistokes.

The superiority of the immersion oil for microscopy of the present invention to conventional immersion oils (for example that mainly composed of benzylbutyl phthalate which contains two aromatic rings in molecule) resides in lower fluorescence, good hue with less haze and high transparency.

That is, the immersion oil for microscopy of the present invention emits less amount of fluorescence by excitation with U exciting light and V exciting light by light from ultra-high pressure mercury lamp. Therefore, the immersion oil of the present invention can be effectively used for fluorescence microscopies by which enough observation cannot be made with conventional immersion oils.

Furthermore, the immersion oil for microscopy of the present invention is high in transparency and good in hue and so is high in usefulness as immersion oil for fluorescence microscopies.

Besides, the immersion oil of the present invention is similar or superior to conventional immersion oils also in other characteristics such as non-drying property, non-toxicity, appearance, weathering resistance, corrosion resistance, contrast and resolving power.

As mentioned above, because of low fluorescence, the immersion oil of the present invention can be suitably used as immersion oil for fluorescence microscopy, but naturally, it can also be suitably used as immersion oil for normal microscopies.

As stated hereabove, the immersion oil of the present invention can be that containing phthalic acid dialkyl ester and chlorinated paraffin and need not contain other components, but may contain other components unless attainment of the object of the present invention is hindered.

As the other components referred to above, mention may be made of, for example, liquid saturated hydrocarbons (e.g., pentane, hexane, heptane, octane, nonane and liquid paraffin), liquid olefin polymers (e.g., liquid polyethylene, liquid polypropylene and liquid polybutene), liquid diene copolymers (e.g., liquid polybutadiene, liquid polyisoprene and liquid polychloroprene), aliphatic saturated alcohols (e.g., methanol, propanol, butanol, pentanol, hexanol, heptanol and octanol), alicyclic alcohols (e.g., cyclobutanol, cyclopentanol, cyclohexanol, cycloheptanol, cyclooctanol, cyclobutenol, cyclopentenol, cyclohexenol, cycloheptenol, cyclooctenol, tricyclodecanol, tricyclododecanol, tricyclodecenol and tricyclododecenol) and carboxylic acid esters (e.g., methyl acetate, ethyl acetate and dicyclopentadiene acetate).

The present invention has the following technical advantages.

The immersion oil for microscopy of the present invention is in the level same as or higher than that of conventional immersion oils in characteristics generally required for immersion oil for microscopy.

Especially, the immersion oil of the present invention is very small in emission of fluorescence caused by U excitation light and V excitation light. Therefore, the immersion oil for microscopy of the present invention is especially useful as immersion oil for fluorescence microscopy.

Further, the immersion oil of the present invention has the characteristics of low viscosity and easy handling.

The present invention is further illustrated with reference to the following examples and comparative examples. Examples 1–5 and Comparative Examples 1–2

The components shown in Table 1 were mixed in amounts as shown therein with stirring at 25° C. for 10 minutes to prepare immersion oils for microscopy.

Refractive index, Abbe's number and kinematic viscosity of the obtained immersion oils were measured. Furthermore, the oils were subjected to tests for fluorescence, non-drying property, hue, weathering resistance, corrosion resistance and transparency. Besides, the oils were evaluated on contrast, resolving power and chromatic aberration from the above results. Results of measurement and evaluation are shown in Table 2.

TABLE 1

| | Examples | | | | | Comparative Examples | |
|---|---|---|---|---|---|---|---|
| | 1 | 2 | 3 | 4 | 5 | 1 | 2 |
| Dimethyl phthalate Amount (Parts by weight) | 100 | 100 | 100 | 100 | — | — | — |
| Dimethyl phthalate Amount (Parts by weight) | — | — | — | — | 100 | — | — |
| Benzylbutyl phthalate Amount (Parts by weight) | — | — | — | — | — | 100 | 100 |
| Chlorinated paraffin | | | | | | | |
| Chlorine content (wt %) | 40 | 45 | 50 | 55 | 50 | — | 50 |
| Amount Parts by weight | 80 | 100 | 50 | 100 | 17 | — | 40 |
| Chlorine content (wt %) | 70 | 65 | 60 | 60 | 60 | 60 | — |
| Amount Parts by weight | 150 | 200 | 200 | 120 | 17 | 200 | — |

TABLE 2

|  | Examples | | | | | Comparative Examples | |
| --- | --- | --- | --- | --- | --- | --- | --- |
|  | 1 | 2 | 3 | 4 | 5 | 1 | 2 |
| Refractive index | 1.515 | 1.515 | 1.515 | 1.515 | 1.515 | 1.515 | 1.515 |
| Abbe'S number | 45.5 | 43.5 | 42.5 | 44.8 | 53.3 | 43.0 | 45.1 |
| Kinematic viscosity | 85 | 83 | 78 | 90 | 250 | 180 | 250 |
| Fluorescence | O | O | O | O | O | X | X |
| Non-drying property | O | O | O | O | O | O | O |
| Hue (appearance) | O | O | O | O | O | O | O |
| Weathering resistance | O | O | O | O | O | O | O |
| Corrosion resistant | O | O | O | O | O | O | O |
| Contrast | O | O | O | O | O | O | O |
| Resolving power | O | O | O | O | O | O | O |
| Transparency | O | O | O | O | O | X | X |

METHOD OF EVALUATION

Measurement and evaluation of properties of the immersion oils as shown in Table 2 were conducted by the following methods.

Refractive index ($n_D^{23}$), Abbe's number ($v_D^{23}$)

These were measured in accordance wiht JIS K2101.

Kinematic viscosity (25° C.)

This was measured in accordance with JIS K2283.

Non-drying property

Test was conducted at 30° C. x 24 hours according to JIS C2101 "Electrical insulating oil" 12, Evaporation amount test. The obtained results were evaluated by the following two grades.

| Evaluation result | Evaporation amount |
| --- | --- |
| Good | Less than 1% by weight |
| Bad | 1% by weight or more |

Appearance

The sample was put in a clean container and turbidity was examined.

Weathering resistance

The immersion oil was subjected to irradiation test and heat deterioration test under the following conditions and evaluation was effected according to the following two grades by comparing refractive index, Abbe's number and hue before test with those after test.
Evaluation
Good: No change occurred in any of refractive index, Abbe's number and hue.
Bad: Change occurred in at least one of refractive index, Abbe's number and hue.

Irradiation Test

A given amount (40±0.5g) of sample was put in a schale (diameter 0 cm) and irradiated with a light (light source: Highlight White FL 20W of Matsushita Electric Industrial Co., Ltd. and distance between the lamp and the sample: 15 cm) for given times (24 hours, 72 hours, 120 hours) and change in refractive index after irradiation was measured.

Heat deterioration test

A given amount (40±0.5g) of sample was put in a 50 ml flask with a ground stopper and left to stand in a thermostat of given temperatures (40, 70° C.) for 24 hours. Thereafter, change in refractive index, Abbe's number and hue was measured.

Corrosion resistance

Corrosion resistance was examined by measuring total acid number (JIS K2501) and influence on a dye for a smear.
Evaluation
Good: Immersion oil had no corrosiveness.
Bad: Immersion oil had corrosiveness.

Contrast

The immersion oil was introduced into a microscopy and a black and white line made on a chromium vapor-deposited black and white plate was observed by said microscopy. Evaluation was made by the following two grades depending on clearness of the line.
Evaluation
Good: Clear
Bad: Somewhat unclear Resolving power Evaluation was made on refractive index according to the following two grades.
Evaluation
Good: Refractive index was 1.5140–1.5160.
Bad: Refractive index was outside the above range.
Evaluation was made on transmittance (JIS K0115) according to the following three grades.
Evaluation
Good: Transmission 95%
Somewhat bad: Transmittance at least 90% and less than 95%
Bad: Transmittance less than 90%
In Table 2, the evaluations "good", "somewhat bad" and "bad" are indicated by "o", "Δ" and "X" respectively.

Next, amount of fluorescence (relative intensity) emitted by the immersion oil was measured.
The results are shown in Table 3.
The measurement was made by fluorospectrometer FP-5504 of Nihon Bunko Co.

TABLE 3

| Exciting light | Examples | | | | | Comparative Examples | |
|---|---|---|---|---|---|---|---|
| | 1 | 2 | 3 | 4 | 5 | 1 | 2 |
| U | 4.8 | 4.5 | 4.6 | 5.2 | 4.5 | 40.0 | 35.0 |
| V | 1.1 | 1.2 | 0.9 | 1.0 | 1.0 | 3.5 | 3.0 |
| B | 0.3 | 0.3 | 0.3 | 0.3 | 0.4 | 0.4 | 0.4 |
| G | 0.2 | 0.2 | 0.2 | 0.2 | 0.4 | 0.4 | 0.4 |

What is claimed is:

1. An immersion oil for microscopy consisting essentially of a phthalic acid dialkyl ester and a chlorinated paraffin.

2. An immersion oil according to claim 1 wherein weight ratio of the phthalic acid dialkyl ester and the chlorinated paraffin is within the range of 20:80–70:30.

3. An immersion oil according to claim 1 wherein alkyl group of the phthalic acid dialkyl ester has 1–5 carbon atoms.

4. An immersion oil according to claim 1 wherein the two alkyl groups of the phthalic acid dialkyl ester are identical.

5. An immersion oil according to claim 1 wherein the phthalic acid dialkyl ester is dimethyl phthalate.

6. An immersion oil according to claim 1 wherein the phthalic acid dialkyl ester is diethyl phthalate.

7. An immersion oil according to claim 1 wherein the chlorinated paraffin has an acid value below 0.50 KOH mg/g, a viscosity at 25° C. of 0.5–40,000 poises, a specific gravity at 25° C. of 1.10–1.80 and a chromaticity (APHA) below 350.

8. An immersion oil according to claim 1 wherein the chlorinated paraffin contains a chlorinated paraffin having a chlorine content of not more than 55% by weight and a chlorinated paraffin having a chlorine content of more than 55% by weight.

9. An immersion oil according to claim 8 wherein the chlorinated paraffin contains a chlorinated paraffin having a chlorine content of 35–55% by weight and a chlorinated paraffin having a chlorine content of 60–75% by weight.

10. An immersion oil according to claim 8 wherein the weight ratio of the chlorinated paraffin having a chlorine content of not more than 55% by weight and the chlorinated paraffin having a chlorine content of more than 55% by weight is within the range of 10:90–80:20.

11. An immersion oil according to claim 10 wherein the weight ratio of the chlorinated paraffin having a chlorine content of not more than 55% by weight and the chlorinated paraffin having a chlorine content of more than 55% by weight is within the range of 10:90–50:50.

12. An immersion oil for fluorescence microscopy consisting essentially of a phthalic acid dialkyl ester and a chlorinated paraffin.

* * * * *